June 8, 1965 R. J. JIMENEZ 3,188,466
SERIALOGRAPH WITH SPACED CARRIERS FOR MOVABLE X-RAY FILM
CASSETTES IN SHIELDED TRAYS
Filed Jan. 31, 1962 8 Sheets-Sheet 1

INVENTOR.
ROBERTO J. JIMENEZ
BY
Michael S. Striker
Attorney

June 8, 1965 R. J. JIMENEZ 3,188,466
SERIALOGRAPH WITH SPACED CARRIERS FOR MOVABLE X-RAY FILM
CASSETTES IN SHIELDED TRAYS
Filed Jan. 31, 1962 8 Sheets-Sheet 2

INVENTOR.
ROBERTO J. JIMENEZ
BY
Michael S. Striker
Atty

June 8, 1965    R. J. JIMENEZ    3,188,466
SERIALOGRAPH WITH SPACED CARRIERS FOR MOVABLE X-RAY FILM
CASSETTES IN SHIELDED TRAYS
Filed Jan. 31, 1962    8 Sheets-Sheet 4

INVENTOR.
ROBERTO J. JIMENEZ
BY

June 8, 1965   R. J. JIMENEZ   3,188,466
SERIALOGRAPH WITH SPACED CARRIERS FOR MOVABLE X-RAY FILM
CASSETTES IN SHIELDED TRAYS
Filed Jan. 31, 1962   8 Sheets-Sheet 5

INVENTOR.
ROBERTO J. JIMENEZ
BY
Michael S. Striker
Atty

INVENTOR.
ROBERTO J. JIMENEZ
BY
Michael S. Striker

June 8, 1965 R. J. JIMENEZ 3,188,466
SERIALOGRAPH WITH SPACED CARRIERS FOR MOVABLE X-RAY FILM
CASSETTES IN SHIELDED TRAYS
Filed Jan. 31, 1962 8 Sheets-Sheet 8

INVENTOR.
ROBERTO J. JIMENEZ
BY
Michael J. Striker
Attorney

United States Patent Office 3,188,466
Patented June 8, 1965

3,188,466
SERIALOGRAPH WITH SPACED CARRIERS FOR MOVABLE X-RAY FILM CASSETTES IN SHIELDED TRAYS
Roberto J. Jimenez, 1456 Ashford Ave., Santurce, Puerto Rico
Filed Jan. 31, 1962, Ser. No. 170,077
10 Claims. (Cl. 250—66)

The present invention relates to X-ray apparatus.

More particularly, the present invention relates to serialographs capable of taking a plurality of X-rays in a given sequence at desired intervals.

Serialographs are particularly suitable for making X-rays of arteries as well as to indicate the flow of blood along the arteries. Thus, as is well-known, a suitable dye is injected into the blood stream in the particular artery which is to be photographed, and a series of X-rays taken at predetermined intervals of a particular area will demonstrate the flow of the dye along the artery so as to indicate to the physician whether or not there is a constriction, for example, impeding the flow of blood along the artery. The present invention facilitates the making of similar studies of veins and lymphatics over extensive areas of the body.

Conventional serialographs suffer from several defects. In the first place, there are exceedingly complicated and expensive requiring, for example, electronic controls, and aside from the cost and complexity of this equipment, it is subject to frequent breakdowns and must be set up for use in a particular location. Skilled personnel is required to operate such apparatus, and it is therefore not readily available under all conditions.

It is a primary object of the present invention to provide a simple inexpensive serialograph which is at the same time portable so that the serialograph of the invention may be easily transported to any desired location and may even be considered expendable under battle conditions, for example.

A further object of the present invention is to provide a serialograph of the above type which is exceedingly simple to operate and which can be used in an extremely limited space without any difficulties, so that the serialograph of the invention may, for example, be used in even the smallest X-ray rooms.

Still another object of the present invention is to provide a serialograph which while being simple, inexpensive, and easily portable, at the same time is capable of handling a series of relatively large cassettes, so that it is possible with the serialograph of the invention to make exposures of relatively large parts of the body such as the entire lower abdomen from above the level of the umbilicus, and both lower extremities of the ankles, for example.

It is an additional object of the present invention to provide a serialograph of the above type which is composed of a plurality of subassemblies capable of easily being assembled and disassembled with a regular screwdriver so that the serialograph of the invention can easily be set up for operation and if required any one subassembly may simply be replaced by another corresponding subassembly without changing the entire serialograph.

It is additionally an object of the invention to provide a serialograph of the above type which can be operated in a number of different ways giving an extremely flexible use to the apparatus of the invention enbling different types of X-ray procedures to be performed with the same serialograph and enabling a cassette to be fully or partially exposed so that, if desired, one X-ray film, 14″ x 36″, located in the cassette may be exposed at once or only part of the film may be exposed depending on the positioning of the cassette, obtaining thereby a plurality of X-rays with a single cassette.

With these objects in view the invention includes, in a serialograph, a frame means which has a pair of substantially parallel mutually spaced wall portions between which a cassette is adapted to be located for shifting movement on one of these wall portions. The other of the wall portions is provided with a parallel grid through which the exposure is made onto the cassette, and this wall which carries the parallel grid has shielded portions adjacent to parallel grid so that the cassette can be suitably positioned in order to have exposures made thereon. The cassette is manually shifted between positions where exposures can and cannot be made, and the size of the grid and the cassette may be substantially equal so that it is possible to take relatively large cassettes and make relatively large X-rays of relatively large parts of the body in an extremely convenient and simple manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
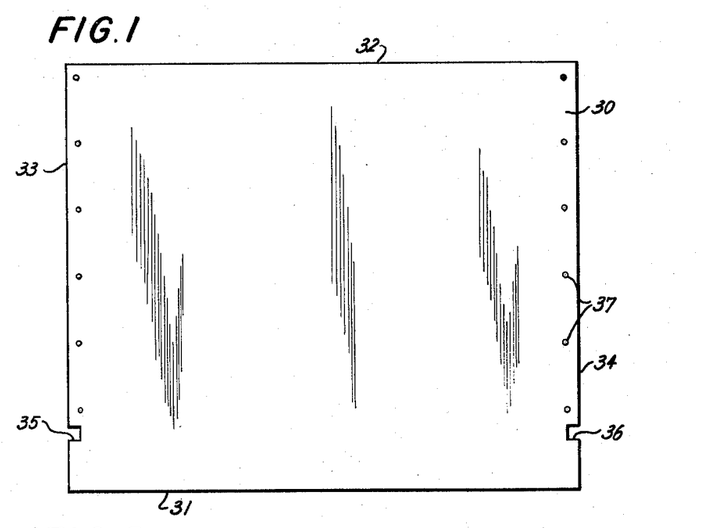
FIG. 1 illustrates the configuration of the bottom wall of the frame means of the serialograph of the invention.
Figure 2:
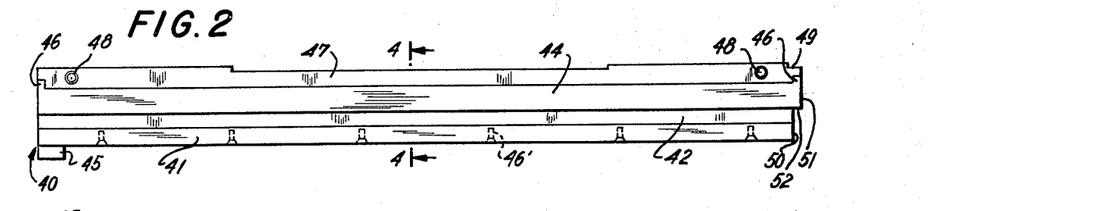
FIG. 2 is an inside view in side elevation of a left end assembly of the serialograph of the invention.
Figure 3:
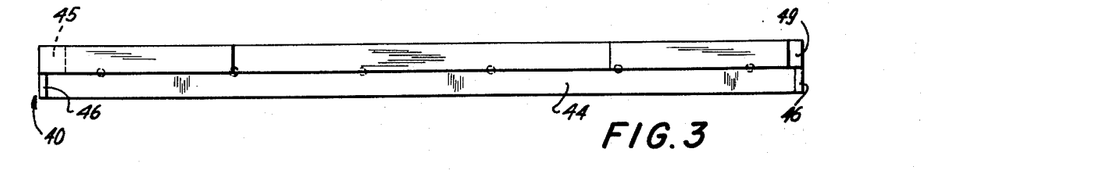
FIG. 3 is a top plan view of the structure of FIG. 2.

Referring now to the drawings, FIG. 1 illustrates the bottom wall of the serialograph of the invention. This bottom wall 30 may be made, for example, of aluminum sheet material which may be, for example, 1/16 inch thick, and as is apparent from FIG. 1 the bottom wall 30 is substantially rectangular. The length of the wall 30 between its front edge 31 and its rear edge 32 is somewhat shorter than the width between the left edge 33 and the right edge 34 of the bottom wall 30. The serialograph of the invention is intended for use with relatively large cassettes. For example, cassettes which are 15 inches by 37 inches in size are used with the invention, and when designed for such relatively large cassettes, the length of the wall 30 between its front edge 31 and its rear edge 32 will be on the order of 34 inches while the width of the wall 30 between its left edge 33 and its right edge 34 will be on the order of 41 inches. Adjacent to its front edge 31, the wall 30 is formed in its side edges 33 and 34 with a pair of notches 35 and 36, for a purpose described below, and these notches are rectangular or square in shape, as is apparent from FIG. 1. Furthermore, the wall 30 is formed along its side edges 33 and 34 with a plurality of openings 37 through which are adapted to pass fastener elements for fixing the bottom wall 30 to left and right end assemblies of the serialograph, these assemblies being described below.

Figure 4:
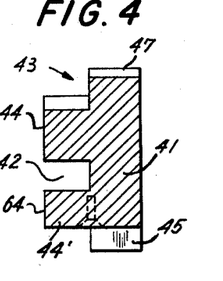
FIG. 4 is a transverse section of the structure of FIG. 2 taken along line 4—4 of FIG. 2 in the direction of the arrows.
Figure 5:
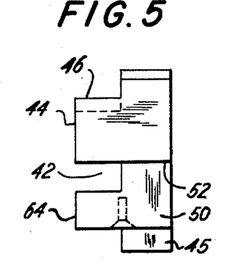
FIG. 5 is an end view of the structure of FIG. 2 as seen from the right end of FIG. 2.
Figure 6:
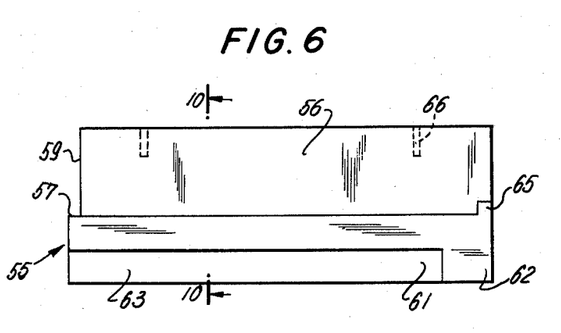
FIG. 6 is an inside view in side elevation of an extension member adapted to be connected with the left end assembly of FIG. 2.
Figure 7:
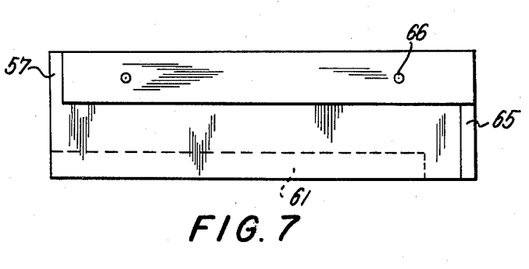
FIG. 7 is a top plan view of the member of FIG. 6.
Figure 8:
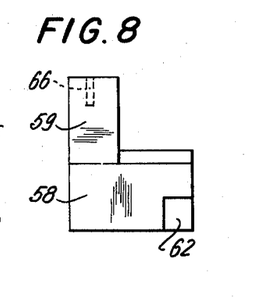
FIG. 8 is an end view of the member of FIG. 7 as seen from the left end thereof.
Figure 9:
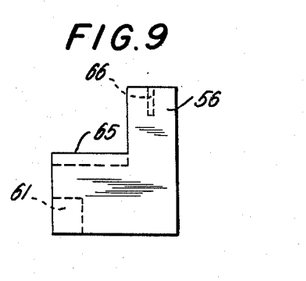
FIG. 9 is an end view of the member of FIG. 7 as seen from the right end thereof.
Figure 10:
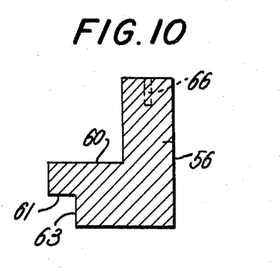
FIG. 10 is a transverse section taken along line 10—10 of FIG. 6 in the direction of the arrows.

Left and right end assemblies are fixed to the bottom wall 30 along its left and right edges 33 and 34, respectively, and these assemblies are mirror images of each other, but are otherwise identical. The left end assembly is illustrated in FIGS. 2–5. Referring to FIG. 5, the left end assembly 40 is in the form of an elongated extrusion of aluminum, for example, and while it is shown in FIG. 4 as being solid, if desired, it may also be a hollow extrusion so as to keep the weight quite low. The bar 41 which forms the left end assembly 40 is formed at its inner face which is visible in FIG. 2 with a longitudinal groove 42 extending throughout the entire length of the bar 41, and the bar 41 is formed with an elongated notch or groove 43 extending downwardly from the top face of the bar 41 so as to form between the grooves 42 and 43 the rib 44 which also extends along the entire length of the bar 41. At its bottom face the bar 41 carries an integral projection 45 at the front end of the bar 41, and the cross-section of the projection 45 mates with the cross-section of the notch 35 of the wall 30 and fits into this notch 35 extending downwardly below the bottom face of the wall 30. Thus, the left end assembly 40 when fastened to the wall 30 will extend rearwardly from the front end of the notch 35 and thus the forward edge 31 of the wall 30 will be located forwardly of the end assembly 40. Along its bottom face the bar 41 is formed with a series of countersunk threaded bores 46′ to receive screws passing through the openings 37 at the left edge 33 of the wall 30 so that in this way the wall 30 is fastened to the left end assembly 40. The rear end of the bar 41, located at the right end of FIG. 2, terminates approximately at the rear edge 32 of the wall 30.

The upper face of the rib 44 is provided at its front and rear ends with transversely extending integral stop portions 46 for a purpose described below. The top face of the bar 41 is formed intermediate its ends with an elongated depressed portion 47 also for a purpose described below. The inner side surface of the portion of the bar 41 which is located just above the rib 44 is formed with one or more depressions 48 forming part of a releasable detent structure as described below. At the rear end of the bar 41, shown at the right in FIGS. 2 and 3, the top face of the bar is formed with a notch 49 extending inwardly from the rear end of the bar through a short distance, and also as will be seen from FIGS. 2 and 5 the rear end of the bar 41 is undercut so as to have a rear end surface 50 at its lower portion located forwardly of the rear end surface 51 and forming the downwardly directed shoulder 52.

FIGS. 6–10 illustrate an extension adapted to be attached to and form an extension of the left end assembly 40. The extension 55 has an upper portion 56 which is of the same thickness as and forms an extension of the portion of the bar 41 which extends above the rib 44. At its front end, shown at the left in FIGS. 6 and 7, the member 55 is formed with an upwardly directed shoulder 57 which extends beneath and engages the downwardly directed shoulder 52 of the bar 41, and the front end face 58 of element 55 engages the end face 50, while the front face portion 59 of element 55 engages the rear face portion 51 of the bar 41. The outer side surfaces of elements 40 and 55 form extensions of each other, and the upwardly directed face 60 of the member 55 is located at the same elevation as the bottom face of the rib 44. Thus, the portion of the element 55 which is located beneath the upwardly directed face 60 thereof closes the rear end of the groove 42, and the member 55 extends inwardly beyond the end assembly 40. Along its lower inner edge the member 55 is formed with an elongated notch 61 of rectangular cross-section, and this notch terminates short of the right end of the element 55, as viewed in FIG. 6, so as to form the stop portion 62. When the extension 55 is assembled with the end assembly 40, the elongated notch 61 will be located just laterally beyond the bottom inner side surface of the bar 41 so that the inner vertical side surface 63 of the notch 61 form an extension of and is aligned with the surface 64 at the inside of the lower rib 44' of the bar 41 (FIG. 4). Also, the surface 60 terminates at its rear end in an upwardly extending transverse projection 65 extending inwardly of the portion 56 of the extension 55 for a purpose described below. As is apparent from FIG. 9, the rear end face of the extension 55 is flat while as is apparent from FIG. 8 the front end face is formed by the portions 58 and 59 which define the shoulder 57 between themselves. In its top face the extension 55 is formed with a pair of threaded bores 66 (FIG. 7) for a purpose described below.

Figure 11:
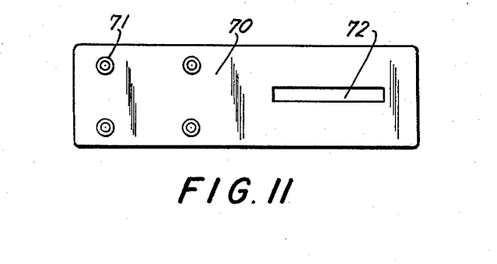
FIG. 11 shows the structure of a connecting plate used to connect the extension member of FIGS. 6–10 to the end assembly of FIGS. 2–5.

A connecting plate 70 is shown in FIG. 11, and this connecting plate serves to connect the extension 55 to the end assembly 40. Thus, as is shown in FIG. 11 the plate 70 is formed adjacent its left end portion, as viewed in FIG. 11, with a plurality of openings 71 through which are adapted to pass a plurality of screws which extend into threaded bores formed in the bar 41 at its outer surface adjacent its rear end so that in this way the connecting plate 70 is fastened to the bar 41, and the right end portion of the plate 70, as viewed in FIG. 11, extends beyond the bar 41 and overlaps the extension 55 and is formed with an elongated slot 72 through which a pair of threaded bores formed in the extension 55 are accessible. Any suitable wing screws or the like extend through the slot 72 into the threaded bores of the extension 55 for the purpose of releasably fixing this extension to the bar 41. While it is possible to form the extension 55 integrally with the end assembly 40, and thus eliminate plate 70 and the screws associated therewith, the illustrated construction is preferred because of the ease with which the parts may be manufactured and assembled as well as disassembled.

While the structure of left end assembly 40 and the left extension 55 have been described above and shown in FIGS. 2–10, together with the connecting plate of FIG. 11, it is to be understood that mirror images of these elements are located at the right end of the serialograph of the invention with a right end assembly fixed to the right edge 34 of the wall 30 in exactly the same way as the left end assembly 40 and with a right extension fixed to and extending from the rear end of the right assembly in the same way as described above. Of course, the bar which forms the right end assembly has a projection extending into the notch 36 shown in FIG. 1.

Figure 12:
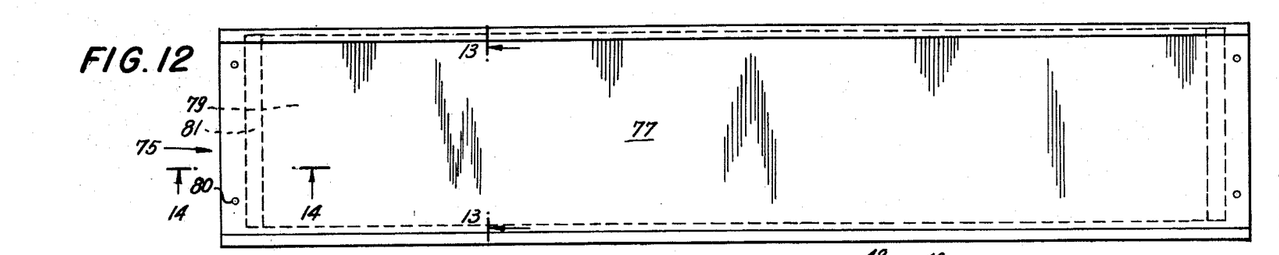
FIG. 12 is a top plan view of a shielding structure adapted to be carried by the extension members one of which is illustrated in FIGS. 6–10.
Figures 13, 15:
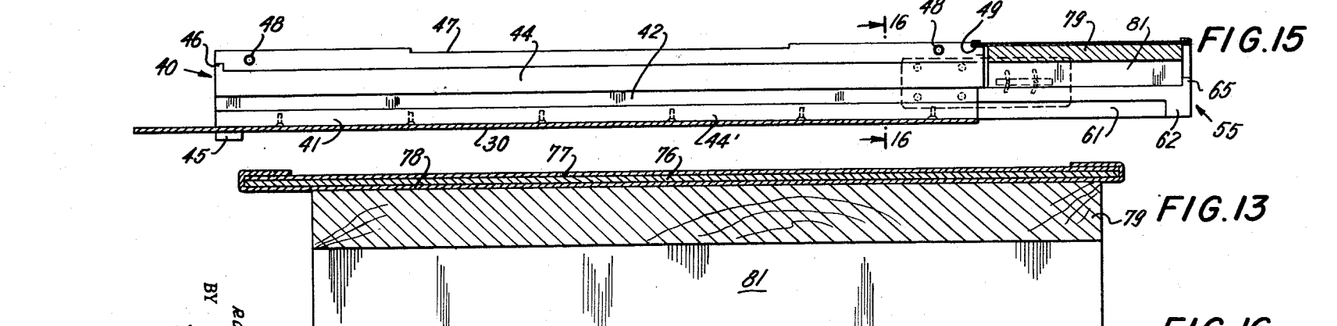
FIG. 13 is a transverse section of the shielding structure of FIG. 12 taken along line 13—13 of FIG. 12 in the direction of the arrows.
FIG. 15 is a longitudinal section of the frame means of the invention illustrating how the elements of FIGS. 1–14 are assembled.
Figure 14:
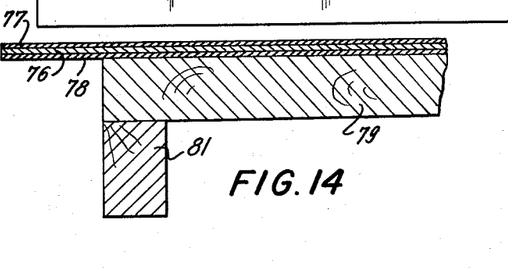
FIG. 14 is a fragmentary section taken along line 14—14 of FIG. 12 in the direction of the arrows and illustrating the structure of the shielding assembly.

Referring now to FIGS. 12–14, there is illustrated therein a shielding unit which is carried by the left and right extensions at the rear of the left and right end assemblies. The shielding unit 75 includes a lead sheet 76 (FIG. 13) enveloped within an aluminum sheet. For example, the aluminum enveloping sheet may include an upper aluminum sheet portion 77 and a lower aluminum sheet portion 78 which has its front and rear edges curved about the front and rear edges of the lead sheet 76 and the sheet 77 in the manner shown in FIG. 13 so that in this way a shielding assembly is provided.

Of course, this assembly will not be very rigid considering its size. Thus, this assembly must extend across the entire rear end portion of the serialograph and in the above-referred to example where cassettes of 15 by 37 inches will be used, the length of the shielding unit shown in FIG. 12 will be on the order of 41 inches. In order to lend this structure rigidity, a wooden substantially flat board 79 is fixed to the underside of the assembly 76–78, and the side edges of the board 79 terminate inwardly of the side edges of the aluminum-lead sandwich 76–78, as indicated in FIG. 12, so as to leave free side edge portions of this sandwich extending beyond the wooden support 79, and these free portions are formed with the openings 80 through which extend screws which are threaded to the extension 55 in the bores 66 thereof so that in this way the shielding sandwich is joined to the rear extension members. Beneath its left and right edges the board 79 is fixed with a pair of boards 81, respectively, which extend from the front to the rear edge of the board 79, as illustrated most clearly in FIG. 13, and it will be noted that both the flat board 79 and the pair of vertical end boards 81 terminate rearwardly of the front edge of the shielding sandwich, as is apparent from FIG. 13. Moreover, the rear edge of this sandwich may extend slightly beyond the rear edge of the board 79, as is also indicated in FIG. 13. The wooden frame 79, 81 may be replaced by a steel frame, if desired, although a wooden frame is preferred because it is lighter and less expensive.

Figure 16:
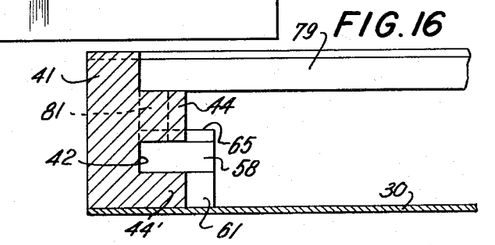
FIG. 16 is a transverse section taken along line 16—16 of FIG. 15 in the direction of the arrows.

The structure described above is assembled into a unit which has its parts joined together and which is adapted to removably receive additional elements of the serialograph of the invention. The assembly of the parts as thus far described is illustrated most clearly in FIGS. 15 and 16. Thus, in FIG. 15 the bottom wall 30 is shown extending forwardly (to the left) beyond the left end assembly 40, and the projection 45 is shown extending beneath the bottom surface of the wall 30. With the left and right end assemblies fixed to the wall 30 there will be a pair of projections 45 which will, for example, come in contact with the metallic or hard-wood front edge of the X-ray table top on which the serialograph is placed and thus prevent the backward sliding of the serialograph as the cassettes are rapidly pushed backward. The manner in which the extension 55 is joined to the left end assembly 40 is also apparent from FIG. 15, and in addition it will be noted that the extension 55 is located rearwardly beyond the wall 30. It will furthermore be noted that the groove 42 of the bar 41 is closed at its rear end by the front end face of the extension 55, and the positioning of the elongated notch 61 with respect to the bar 41 is also clearly shown in FIG. 16. The wooden member 81 is received on the upper surface 60 of extension 55 with the rear edge of member 81 engaging the stop portion 65 so that in this way the longitudinal position of the shielding assembly is determined rearwardly, and the forwardly projecting portion of the aluminum-lead sandwich extends into the notch 49 so as to have an overlapping relation with the rear end portion of the end assembly 40, as indicated in FIG. 15. It will be noted that the ribs 44 and 44' extend inwardly beyond the wooden element 8. Moreover, the outer side surface of the element 81 as well as the end face of the board 79 engages the inner side surface of the portion 56 of the extension 55, as is clearly apparent from FIG. 16. The engagement of the front edge of the aluminum-lead sandwich 76–78 with the forward edge of the notch 49 determines the location of the rear shield unit 75 forwardly, while the pair of stop shoulders 65 of the pair of rear extensions cooperate with the pair of members 81 to determine or limit the rearward movement of the shielding unit 75, so that in this way this unit has its position determined. FIG. 15 also shows the manner in which the connecting plate 70 overlaps the pair of elements 40 and 55 to enable these elements to be releasably connected together in the manner described above.

Figures 17, 18:
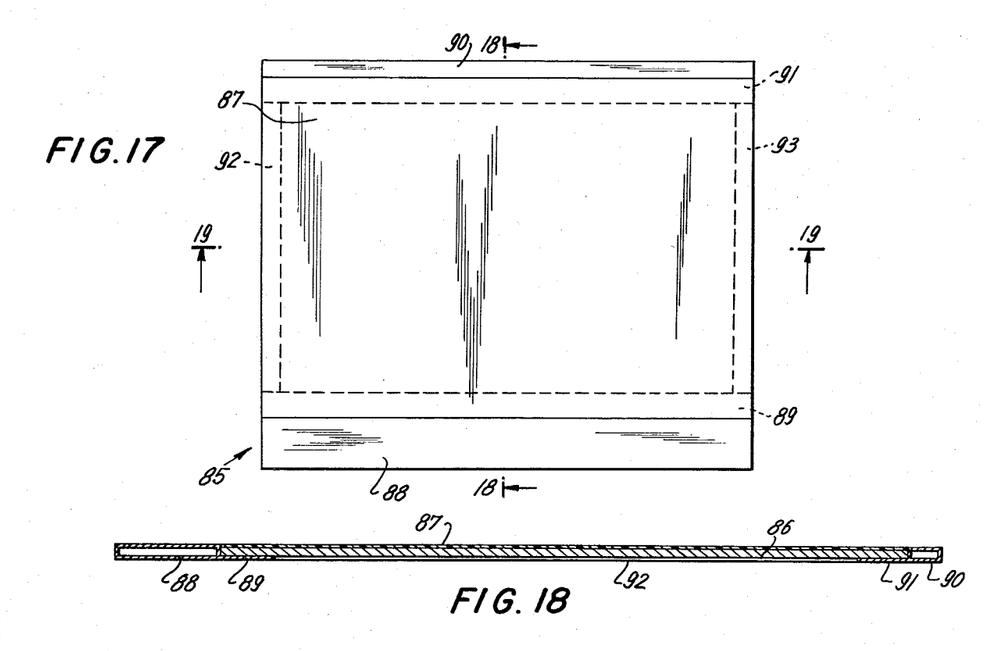
FIG. 17 is a top plan view of a middle assembly which forms one of the cassette-supporting walls of the frame means of the invention.
FIG. 18 is a transverse section of the middle assembly of FIG. 17 taken along line 18—18 of FIG. 17 in the direction of the arrows.
Figure 19:
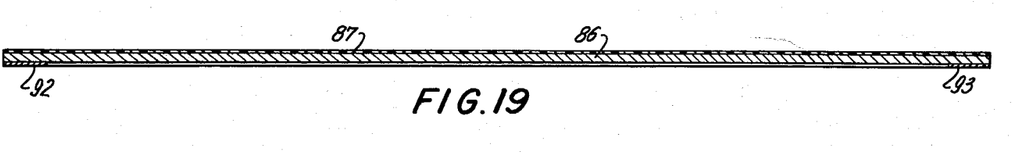
FIG. 19 is a section perpendicular to that of FIG. 18 also showing further details of the middle assembly of FIG. 17, FIG. 19 being taken along line 19—19 of FIG. 17 in the direction of the arrows.

The right end assembly which is a mirror image of the assembly 40 will of course have a groove aligned with and directed toward the groove 42, and also this right assembly has a rib aligned with and directed toward the rib 44 of the assembly 40. This pair of aligned grooves 42 are adapted to slidably receive a middle assembly which forms one of the walls of the frame means of the serialograph of the invention, and this middle assembly is illustrated in FIGS. 17–19. The middle assembly 85 is formed principally of a plywood board 86 fused at its upper surface with a Bakelite sheet 87, for example, so that the material of the middle assembly will have no influence on the X-rays which can clearly pass through this material. At its front edge the middle assembly includes a hollow tubular member 88 formed, for example, by bending a sheet of aluminum in the manner indicated most clearly in FIG. 18 so that this tubular element 88 which extends all along the front edge of the middle assembly 85 has a rearwardly extending portion 89 engaging the underside of the plywood element 86. A similar tubular member 90 also formed by suitably bending a sheet of aluminum, for example, is fixed to the rear edge of the unit 86, 87 and has a forwardly extending portion 91 engaging the underside of the plywood 86. The assembly 86, 87 is fixed to the front and rear tubular portions 88 and 90 through any suitable screw members or the like, and along its side edges between the tubular elements 88 and 90 the board 86 has fixed to its underside a pair of elongated aluminum strips 92 and 93. With this construction there will be an area surrounded by the aluminum elements 88, 90, 92 and 93 defining a free area through the elements 86 and 87 through which the X-rays may pass and in addition all of these aluminum elements serve to greatly reinforce the middle assembly so that it will not warp. The left and right edge portions of the middle assembly, as viewed in FIG. 17, are adapted to be slid into the pair of grooves 42 of the left and right end assemblies 40, and the middle assembly 85 can be moved rearwardly until it engages the front end face portions 58 of the pair of rear extensions 55, so that these extensions 55 by closing the rear ends of the grooves 42 serve to determine the rear end position of the middle assembly 85. The length of the middle assembly 85 is such that its front portion extends forwardly beyond the pair of end assemblies, but the front edge of the wall 30 also extends forwardly beyond the front edge of the middle assembly 85 when the latter has been shifted in the grooves 42 all the way to the rear into engagement with the rear extensions 55. It will be noted that with this construction the space between the wall 30 and the middle assembly 85 will be determined by the thickness of the pair of lower ribs 44' so that these ribs 44' together with the wall 30 and the middle assembly 85 define a space in which a cassette is capable of being shifted in a manner described below.

Figure 20:
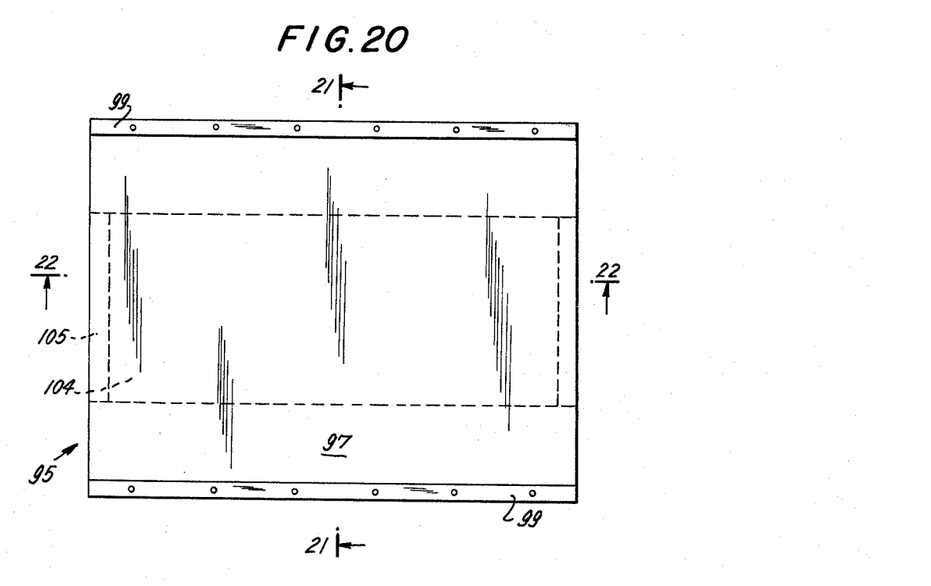
FIG. 20 is a top plan view of a top assembly which forms the uppermost wall of the frame means of the invention.
Figure 21:
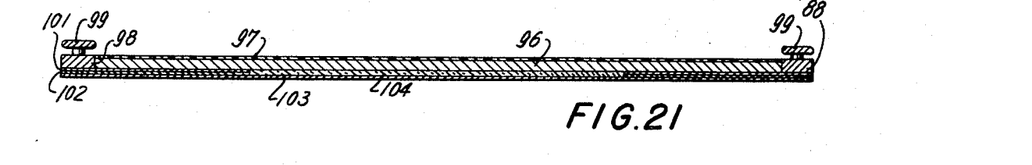
FIG. 21 is a section of the top assembly taken along line 21—21 of FIG. 20 in the direction of the arrows.
Figure 22:
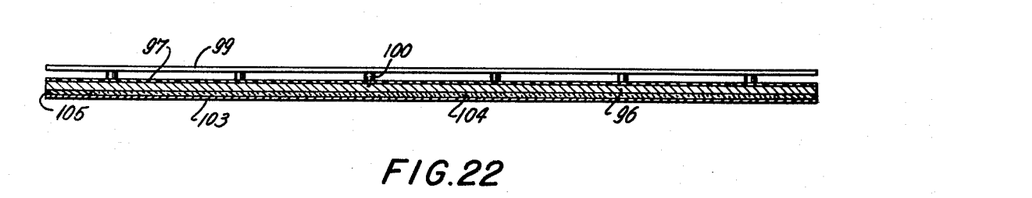
FIG. 22 is another section of the top assembly taken along line 22—22 of FIG. 20 in the direction of the arrows.

The serialograph of the invention includes above the middle assembly, when the latter is located within the grooves 42 of the left and right end assemblies 40, a top assembly 95 the details of which are shown in FIGS 20–22. The top assembly 95 is located between the uppermost portions of the left and right end assemblies and rests upon the pair of ribs 44 so that these ribs 44 maintain the top assembly spaced from the middle assembly to provide between these assemblies a space in which another cassette may be located, as described below.

Referring to FIGS. 20–22, the top assembly 95 also includes a plywood board 96 which is bonded with a Bakelite sheet 97 to form a Bakelite-plywood panel 96, 97. At the front and rear edges of this panel 96, 97 is located a pair of elongated aluminum bars 98. Each of these bars is formed with a series of threaded bores distributed along its length and a pair of slide bars 99 are respectively located over the bars 98, and these slide bars 99 may also be made of aluminum. A plurality of sleeves 100 are distributed along each of the bars 98 on the top surface thereof and carry the bars 99, and the several screw members which are threaded to the bars 99 and through the sleeves 100 into threaded connection with the bars 98 so that in this way the slide bars 99 are fixed to the bars 98 which in turn are fixed to the panel 96, 97. These slide bars 99 are adapted to receive a compression device in the form of a flexible sheet or the like of known construction and well-known in the art. This compression device is used to press the limb which is being X-rayed against the upper surface of the top assembly 95 or to apply pressure over the pelvis against a rubber balloon during use of the apparatus. The compression device also serves to compress the pelvic region against a rubber balloon placed on the top assembly 95 temporarily and partially obstructing the flow of the blood in the large abdominal aorta and facilitating the visualization of the renal arteries and other visceral branches of the aorta. Beneath each of the bars 98 is located an aluminum strip 101 which extends inwardly beyond each of the bars 98 into overlapping relation with the plywood board 96, and beneath each of these strips 101, which extend across the front and rear of the top assembly, is located a lead sheet 102, and then beneath the pair of lead sheets 102 which extend across the front and rear of the top assembly is located a third aluminum sheet 103 which extends across the entire lower part of the top assembly, suitable bolts of brass or the like being used to fix the sheets 101–103 to each other as well as to the panel 96, 97 so that a single unitary assembly is provided. The width of the pair of lead sheets 102 and aluminum sheets 101 is such that there remains between these pairs of sheets 101 and 102 a space extending completely across the top assembly and receiving a parallel grid 104 of a construction well-known in the art for directing and focusing the X-rays onto a cassette located beneath the grid 104. The width of the grid 104, between the pairs of sheets 101, 102 is equal to the width of the cassette, so that in the above example where a relatively large cassette on the order of 15 by 37 inches is used, the width of the parallel grid 104 is 15 inches, and of course its length is approximately 36 inches so that it is possible to expose the entire X-ray film with one exposure. The length of the top assembly between its left and right edges, as viewed in FIG. 20, is of course equal to the distance between the uppermost portions of the left and right end assemblies 40 so that the top assembly rests on the ribs 44, as pointed out above, and this dimension is somewhat greater than the length of the cassette which of course will be located between the ribs 44 on top of the middle assembly to slide rearwardly in the space between the top and middle assemblies as described below, and therefore the parallel grid 104 does not extend along the entire length of the top assembly. There are a pair of aluminum strips 105 whose thickness equals the total thickness of the sheets 101 and 102 and of the parallel grid 104, and these strips 105 extend along the left and right edges of the top assembly at the ends of the parallel grid between the board 96 and the lower sheet 103, so that in this way the parallel grid is completely confined within the top assembly. As was pointed out above in connection with FIG. 2, the left and right end assemblies are formed with one or more recesses 48 forming part of detent devices, and the top assembly may be provided along its left and right edges with suitable spring-pressed balls or the like adapted to enter into the recesses 48 so as to provide a releasable connection between the top assembly and the end assemblies. The length of the top assembly between its front and rear edges is equal to the distance between the pair of stop projections 46 at the ends of each rib 44, and when the top assembly is positioned on the ribs 44 the front and rear edges of the top assembly will be confined between the stop portions 46 which therefore determine the position of the top assembly in the entire apparatus. It will be noted from FIG. 2 that the shoulder or recess 49 extends from the rear end surface 51 of the assembly 40 by a distance greater than the rear stop shoulder 46 so that the top shielding unit 75 at its front edge will slightly overlap the rear edge portion of the top assembly and thus the shielding sandwich 76–78 will in effect form an extension of the rear shielding plate 102 of the top assembly. The total width of the sheet 102 at the rear of the top assembly and the lead sheet 76 is such that when a cassette has been shifted to the rear so that it is out of line with the parallel grid 104, the entire cassette can be located beneath the shielding structure at the rear of the top assembly and at the shielding unit 75 and thus be completely protected from exposure to X-rays used to expose additional cassettes in a manner described below.

Figure 23:
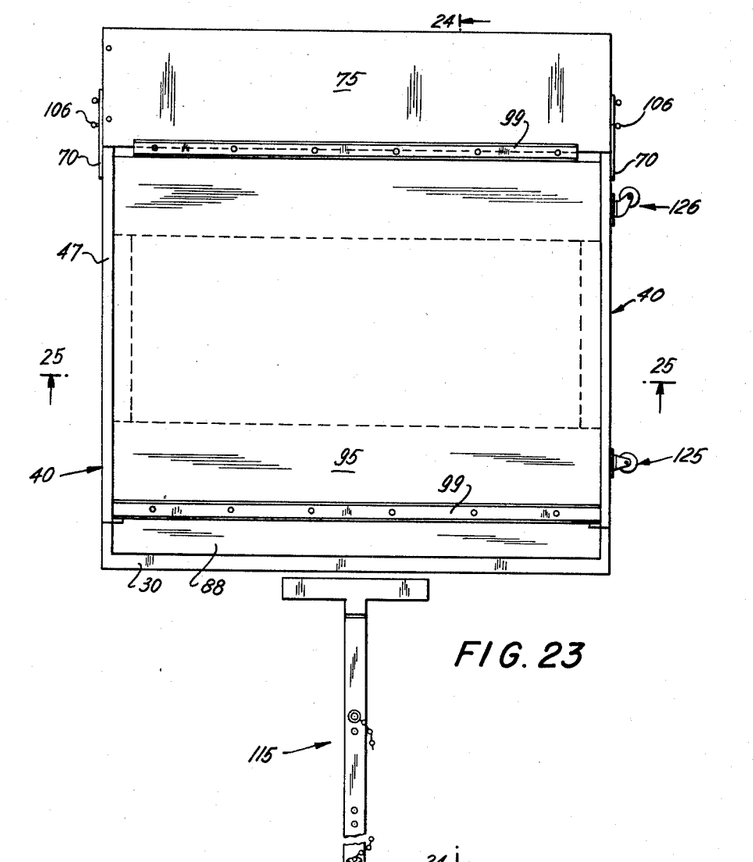
FIG. 23 is a top plan view of the entire serialograph of the invention with all of the parts thereof assembled together.
Figure 24:
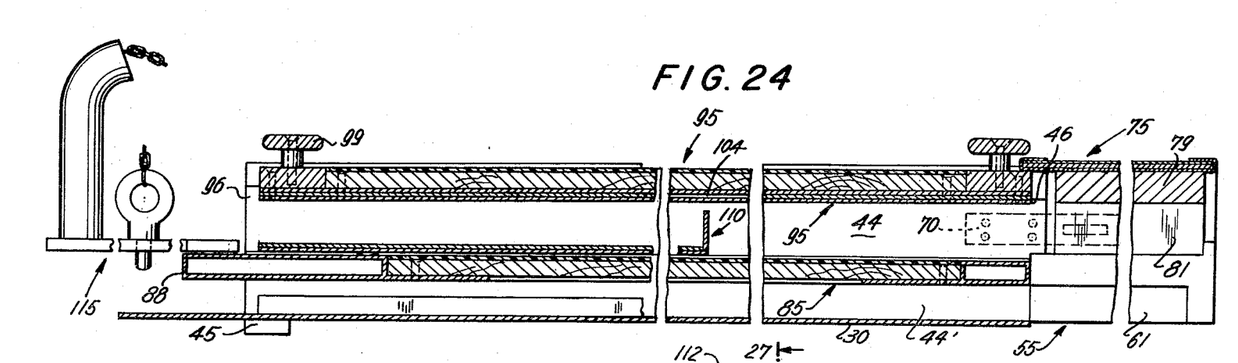
FIG. 24 is a longitudinal section of the structure of FIG. 23 taken along line 24—24 of FIG. 23 in the direction of the arrows.
Figures 25, 26, 27:
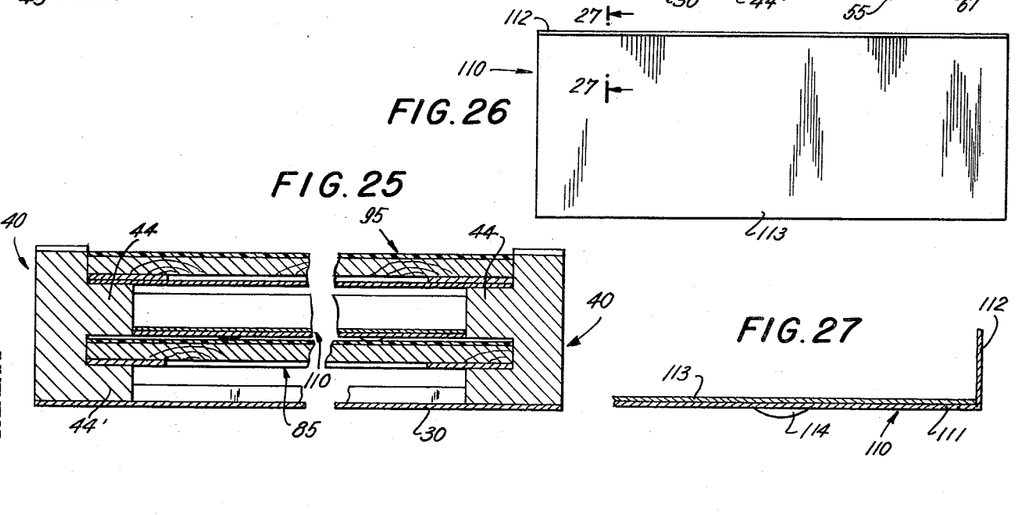
FIG. 25 is a transverse section of the structure of FIG. 23 taken along line 25—25 of FIG. 23 in the direction of the arrows.
FIG. 26 is a top plan view of a cassette-carrying tray used with the serialograph of the invention.
FIG. 27 is a fragmentary transverse section of the tray of FIG. 26 taken along line 27—27 of FIG. 26 in the direction of the arrows.

FIGS. 23–25 show the top assembly 95 and middle assembly 85 assembled with the remaining structure described above. Thus, FIG. 23 illustrates the left and right end assemblies 40 carrying the top assembly 95, and in addition FIG. 23 shows the connecting plates 70. These connecting plates 70 serve, as pointed out above, to connect the rear extensions 55 to the end assemblies 40, and FIG. 23 shows the thumb screws 106 which respectively pass through the slots 72 of the connecting plates 70 into threaded openings of the rear extensions 55 as described above. Moreover, FIG. 23 clearly illustrates how the front portion 88 of the middle assembly extends forwardly beyond the top assembly 95 and in addition how the front portion of the bottom plate 30 extends forwardly beyond the middle assembly.

This relationship is also apparent from FIG. 24 which in addition shows how the rear end of the middle assembly 85 engages the front end faces of the rear extensions 55, and in addition FIG. 24 shows how the stop portions 46 of each end assembly engage the front and rear edges of the top assembly 95. Furthermore the overlapping relationship between the shielding unit 75 and the top assembly is also clearly apparent from FIG. 24.

In FIG. 25 the manner in which the pair of end assemblies 40 support the top and middle assemblies as well as the manner in which they are interconnected by the bottom plate 30 are clearly illustrated.

Figure 28:
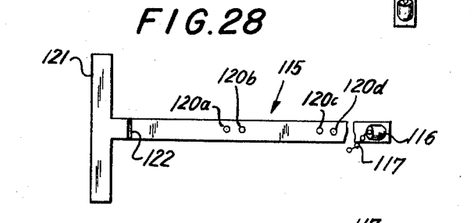
FIG. 28 is a top plan view of a palette used for positioning and shifting the cassettes.
Figure 29:
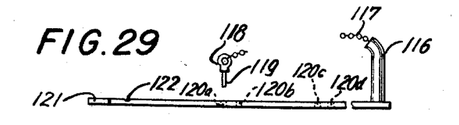
FIG. 29 is a side elevation of the palette of FIG. 28.

The structure of the invention is completed by the elements shown in FIGS. 26–29. FIGS. 26 and 27 illustrate a tray 110 which is adapted to be located between the middle and top assemblies resting on the middle assembly, while FIGS. 28 and 29 illustrate a palette which is used by the operator to shift the cassettes in a manner described below.

The tray 110 is in the form of a simple sheet of aluminum which may have a thickness on the order of 1/16 inch, for example, and this sheet has a flat horizontal portion 111 integral at its rear edge with an upstanding flange 112 which has a width somewhat less than the thickness of the ribs 44 so that the entire tray can be easily located between the middle and top assemblies. A lead sheet 113 is located on the top face of the bottom wall 111 of the tray 110 so that the X-rays cannot pass through the tray. The dimensions of the bottom wall 111 of the tray 110 will correspond to the size of the cassette, so that in the case of a 15 by 37 inch cassette, the bottom wall 111 will have dimensions of 15 by 37 inches, and the entire bottom wall is covered with the lead sheet 113 so as to be impervious to X-rays. Moreover, the bottom wall may have convexly curved depressions 114 projecting at its bottom face and formed by simply providing slightly dished depressions in the wall 111, so that these projections 114 reduce the frictional engagement between the tray and the top surface of the middle assembly 85 and thus it is very easy for the operator to slide the tray 110 along the top surface of the middle assembly 85.

The palette 115 is in the form of an elongated substantially T-shaped bar which has at its right end, as viewed in FIGS. 28 and 29, an upstanding handle 116 adapted to be grasped by the operator, and through a suitable chain or the like 117 a pin 118 is connected to the handle 116 so that this pin will not become lost. The pin 118 has a lower elongated portion 119 of reduced diameter adapted to be placed in any one of the openings 120a–120d shown in FIG. 28 passing through the palette 115. There are four openings 120a–120d, for a purpose described below, and in addition the upper face of the palette 115 is formed adjacent to its front cross bar portion 121 with a transverse groove 122 which is clearly visible to the operator and which is used for positioning the palette in a predetermined position with respect to the remainder of the apparatus in a manner described below.

The palette 115 is shown together with the remaining structure in FIGS. 23 and 24, and FIGS. 24 and 25 show the tray 110 located on the middle assembly 85 between the latter and the top assembly 95.

As is illustrated in FIG. 23, the right end assembly 40 fixedly carries at its outer side face rollers 125 and 126. The roller 125 may have its bracket fixed to the right end assembly, while the bracket of the roller 126 may be connected through a swivel arrangement to the right end assembly 40. The entire structure is not very heavy and it can, in order to be rendered easily portable, be rested on the rollers 125 and 126 and easily rolled on any floor from one location to another, and the swiveling of the roller 126 permits easy maneuvering of the entire serialograph. Moreover, the size of the entire construction is such that it may be placed without any difficulty in a trunk of a conventional automobile of the usual sedan type.

Figure 30:
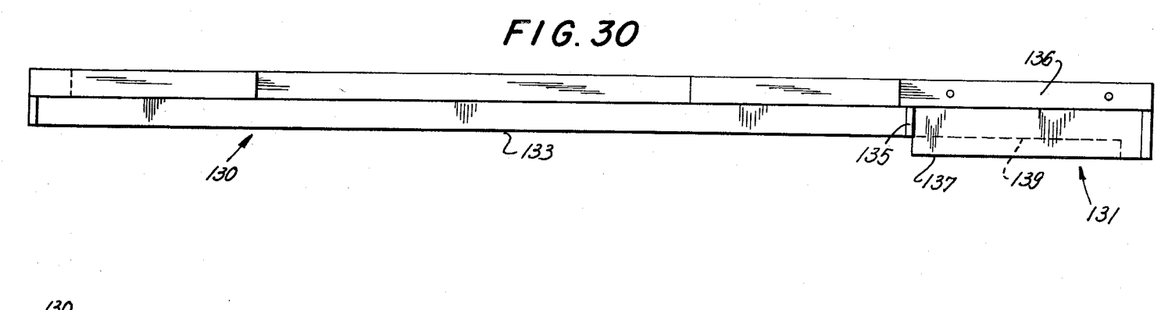
FIG. 30 is a top plan view of a variation according to which the left end assembly and the extension which cooperates therewith are integral.
Figure 31:
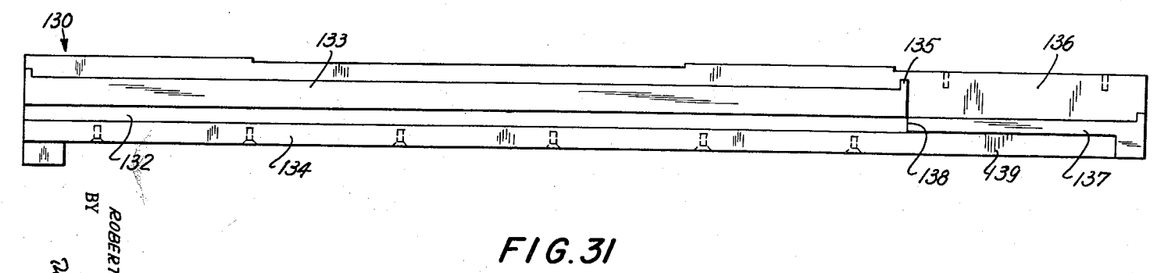
FIG. 31 is an inside view in side elevation of the structure of FIG. 30.

FIGS. 30 and 31 show an arrangement where a left end assembly 130 and a left end extension 131 are integral with each other so that with this embodiment connecting plates 70 and the structure associated therewith is unnecessary. It will be noted that the left end assembly 130 has a groove 132 for receiving the middle assembly, in the same way as the groove 42, and also a rib 133 as well as a lower rib 134 are provided as is the case with the left end assembly 40. The left end assembly 130 is identical with the left end assembly 40 up to the region of the rear stop shoulder 135 for the top assembly, this shoulder 135 corresponding, of course, to the stop shoulder 46. However, at this location the extension 131 is integrally joined to the left end assembly 130 so that the inner side face 136 of extension 131 forms a continuation of the inner side face of the assembly 130 at its portion located above the rib 133. The portion 137 of the extension 131, of course, closes at its left end 138, as viewed in FIG. 31, the groove 132, while beneath the portion 137 the inner side face 139 forms an extension of the side face of the lower rib 134. Thus, the extension 131 is in fact identical with the extension 55 except that it is integral with the left end assembly 130.

The right end assembly and its extension can also be formed integrally with each other and form an inner image of the structure of FIGS. 30 and 31, and of course the right end assembly can carry wheels as described above to facilitate transportation of the serialograph. All of the other structure of the serialograph described above cooperates with the left and right end assemblies and their integral extensions in the manner described above where these extensions are joined to the left and right end assemblies.

It should be noted in connection with the top assembly 95 that the width of the sheets 101 and 102 is approximately one quarter of the entire length of the top assembly 95 from its front edge to its rear edge and that the parallel grid 104 has a width which is approximately one half of the entire length of the top assembly from its front to its rear edge, so that the width of the parallel grid 104 is approximately twice the width of each of the sheets 101 and 102, and in addition it will be noted that with this construction almost one half of the entire area of the entire assembly is available for making quite a large X-ray.

The above-described structure of the invention can be used in a number of different ways in order to take a series of X-rays. Assuming, for example, that it is desired only to make two X-rays of relatively large size on the order of 14 by 36 inches, the operator will place one cassette of 15 by 37 inches on the tray 110 and slip this tray between the top and middle assemblies and the second cassette of the same size will be placed on the bottom wall 30 between the latter and the middle assembly. The openings 120a and 120c of the palette 115 position the pin 118 for cooperation with the front edge of the middle assembly 85, while the openings 120b and 120d position the pin 118 for use with the front edge of the bottom wall 30.

It is to be understood that the entire assembly is placed on the X-ray table with the bottom wall 30 having its front edge aligned with or projecting somewhat beyond the side edge of the table and with the projections 45 of the left and right end assemblies engaging the top of the table, as pointed out above, so that the front edges of the wall 30 and the middle assembly 85 are readily accessible to the operator who stands at the front of the apparatus. The distance of the opening 120a to the rear of the front edge of the cross bar portion 121 of the palette 115 is such that when the pin in the opening 120a engages the front edge of the middle assembly 85, at its forward tubular portion 88, the tray with its front edge engaging the cross bar portion 121 will be positioned directly beneath the grid 104, so that with the use of the palette the operator very precisely positions the cassette which is on the tray 110 directly beneath the grid 104. The second cassette is simply placed on the wall 30, and with the pin 118 in the opening 120b, the operator will move the palette forwardly until the pin engages the front edge of the wall 30, and this will precisely locate the lower cassette beneath the cassette which is on the tray 110, and of course both of the cassettes will be aligned directly beneath the grid 104. The operator can now proceed to make an exposure of the film in the cassette on the tray 110, and because of the lead sheet 113 carried by the tray 110 the lower cassette will not be exposed. Immediately after the exposure of the upper cassette the operator will push the tray 110 all the way back without the pin 118 in any of the openings 120a–120d of the palette 115, and the operator will then know that the entire upper cassette is located beneath the shielding structure provided by the rear sheet 102 of the top assembly and the lead sandwich of the shielding unit 75. Then an exposure of the lower film can be made and the operator by pushing the lower cassette with the palette will then locate the lower cassette in a rear position beneath the shielding structure. The second exposure may be made at a predetermined interval after the first exposure so that the two X-rays can be compared. It will be noted that because the rear edge of the bottom wall 30 does not extend beneath the extensions 55 the lower cassette is easily accessible at the rear of the apparatus but cannot fall out or be removed from this rear end because the front half of the cassette remains fitting snugly between the bottom wall 30 and the middle assembly 85. When the lower cassette is moved to the rear its rear edge portion is guided along the lower elongated notches 61 of the rear extensions 55 and of course the stop portions 62 at the rear of the notches 61 limits the rearward movement of lower cassette. Thus, the palette 115, with handle 116 inverted, for example, can be moved forwardly through the rear of the serialograph to push the tray with the exposed cassette thereon and the lower cassette back to the front to be removed. The tray 110 upon being moved rearwardly will simply ride onto the upwardly directed surface portions 60 of the rear extensions 55 and the rearward movement of the tray is limited by the pair of rear stop projections 65 of the pair of rear extensions 55. Here again it will be noted that the tray is easily pushed forwardly from the rear of the apparatus.

In the above-described manner it is possible to very quickly and easily make two exposures on relatively large X-ray films at a desired interval between the exposures and in an extremely simple way without the use of any structure which can become inoperative. If it is desired to make two additional exposures of the same size then the operator can quickly slip onto the wall 30, after the second exposure, a third cassette which with the palette can be precisely positioned beneath the grid 104 so that a third exposure can be made, and then a second tray with a fourth cassette thereon can be slipped into position between the middle and top assemblies and again positioned precisely beneath the grid 104 so that a fourth exposure can then be made, and of course the intervals between the exposures may without difficulty be on the order of one or two seconds, if desired, so that with the structure of the invention it is possible to very quickly make a series of relatively large X-rays.

It is also possible to expose only one half of a relatively large X-ray film on the order of 14 x 36 inches. Thus, if it is desired only to make an exposure through the front half of the grid 104, the operator can place over the rear half of the grid 104 a rubber-covered lead shield, and the depressions 47 of the left and right end assemblies are provided for the purpose of receiving the ends of such a shield so that with a rubber-covered lead shield of suitable width it is possible to shift this lead shield either to the rear so as to engage the shoulders at the rear ends of the depressions 47 or to the front to engage the shoulders at the front ends of the depressions 47. Assuming that it is desired to make an exposure only through the front half of the grid 104, then the rubber-covered lead shield will be placed over the rear half of the grid 104. The pair of cassettes, with the upper one on the tray 110, will again be positioned on the plate 30 and on the middle assembly, but in this case the operator will use the mark provided by the groove 122 in order to initially position the cassettes. When the cassette on the tray is positioned so that the front edge of the tray engages the front edge of the cross bar portion 121 while the mark 122 is visually aligned with the front edge of the middle assembly 85, the cassette will be positioned precisely so that only its rear half extends beyond the front lead strip 102 of the top assembly so as to be exposed beneath the front half of the grid 104, and the lower cassette can be positioned in precisely the same way, the operator now aligning the mark 122 again with the front edge of the middle assembly, although in this latter case the front edge of the middle assembly is over the mark 122, while when using the tray which is on top of the middle assembly the mark 122 is above the middle assembly. With the pair of cassettes thus positioned, the operator can make the first exposure on the rear half of the top cassette, and then with the pin in the opening 120a of the palette 115, the top cassette can be positioned so that it is precisely aligned with the entire grid 104, and then the second exposure can be made on the front half of the X-ray film through the uncovered front portion of the grid 104. Then the tray with the exposed cassette thereon is shifted all the way to the rear and these operations are repeated with the lower cassette, so that in this way it is possible to provide two exposures on each of the films at desired intervals between all of the exposures.

It is similarly possible to provide exposure on one half of the film through the rear portion of the grid 104, and in this case the rubber-covered lead shield would be shifted to the front part of the grid 104 so as to leave only the rear portion thereof uncovered. In this event the cassettes would be initially positioned so that they are precisely aligned with the grid 104, and then each cassette would be moved rearwardly through a distance equal to one half of its width so that again first the rear portion and then the front portion of each cassette would be exposed, only in this case the exposure would be made through the rear part of the grid 104. The pin in the opening 120c of the palette 115 is used with the front edge of the middle assembly to move the upper cassette on the tray 110 rearwardly through a distance which will precisely locate the front half of the cassette beneath the rear half of the grid 104, and the pin 118 in the opening 120d cooperates with the front edge of the plate 30 in order to enable the operator to very precisely locate the front portion of the lower cassette in alignment with the rear portion of the grid 104. The entire palette without any of the pins is used to move the cassettes all the way to the rear where the stop portions 65 limit the rearward movement of the tray while the stop portions 62 of the extensions 55 limit the rearward movement of the lower cassette.

All of these operations are possible with the structure of the invention, and the particular operation used will depend upon the particular limbs which are X-rayed. For example, in the case of X-raying arteries in one entire lower extremity from the pelvis to the ankle, one half of the entire grid will be used to make a series of relatively large X-rays, 7 x 36 inches. In the case of X-raying arteries in both entire lower extremities simultaneously, including the abdominal aorta as well, the entire grid will be used to make a series of relatively large X-rays, 14 x 36 inches.

As has been pointed out above, the serialograph is particularly suitable for taking a series of X-rays which will show the progress of a suitable dye or the like in the bloodstream along a particular artery, and by comparing the series of X-rays which are taken at predetermined intervals the physician will know where constrictions or the like in the arteries occur.

It will be noted that not only are all of the various components of the serialograph of the invention quite simple and rugged, but in addition all of the parts are very easily assembled and disassembled. The rear shielding unit 75 is very easily fixed with the rear extensions 55 which in turn by way of the plates 70 and the thumbscrews 106 are very easily joined to the end assemblies which in turn are fixed in a simple manner to the bottom wall 30. The middle assembly 85 is easily and quickly slipped along the grooves 42 until it engages the front faces of the rear extensions 55, and in this simple way the middle assembly is positioned for operation, while the top assembly is very quickly and easily placed on top of the ribs 44 between the stop portions 46 thereof so that in this way also the top assembly is very quickly and easily joined to the remainder of the apparatus. The top assemblies as well as the middle assemblies are also capable of being removed from the end assemblies as quickly and easily as they are placed thereon.

It will be understood that each of the elements described above, or two or more together, may also find a useful application in other types of X-ray apparatus differing from the types described above.

While the invention has been illustrated and described as embodied in a serialograph, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a serialograph, in combination, frame means including three mutually spaced, substantially parallel walls between which a pair of cassettes are adapted to be located with the intermediate one of said walls located between the pair of cassettes; a parallel grid having substantially the same area as the cassettes carried by one of said walls for exposing a cassette therebeneath; a tray located on said intermediate wall beneath said one wall in alignment with the parallel grid thereof and said tray carrying a shield of substantially the same area as said parallel grid and the cassettes, and the second cassette being located between said intermediate wall and third wall also in alignment with the parallel grid, whereby during exposure of a cassette on said tray the shield carried by the latter will prevent exposure of the cassette between the intermediate and third walls, so that after exposure of the cassette on the tray the exposed cassette and tray may be shifted on said intermediate wall to a position out of alignment with the parallel grid so that a second exposure may then be made on the second cassette located between the intermediate and third walls in alignment with the parallel grid.

2. In a serialograph, in combination, upper wall means and at least one lower wall means spaced beneath and substantially parallel to said upper wall means whereby a cassette may be located between said upper and lower wall means carried by the latter for shifting movement therealong, said upper wall means having a width substantially equal to that of the cassette and said lower wall means having substantially the same width as said upper wall means and said upper wall means having between its front and rear ends and throughout its width a parallel grid through which a cassette on said lower wall means may be exposed and said upper wall means carrying between said parallel grid and its rear end a shielded portion beneath which the cassette may be located on said lower wall means after exposure of the cassette, said lower wall means having a rear end terminating short of the rear end of said upper wall means so that the latter extends rearwardly beyond said lower wall means, said lower wall means having a front end extending forwardly beyond said upper wall means; a third wall means located beneath said lower wall means and being substantially parallel thereto for supporting a cassette between said lower and third wall means, said third wall means also having a rear end terminating short of the rear end of said upper wall means and said third wall means having a front end located forwardly beyond the front end of said lower wall means; and a tray adapted to be located between said upper and lower wall means and carrying a shield on which the cassette between said upper and lower wall means is placed so that a pair of cassettes may be located one above the other with said lower wall means therebetween and an exposure may be made on the cassette carried by the tray after which when the latter cassette has been shifted rearwardly on said lower wall means an exposure may be made through said upper and lower wall means onto a cassette carried by said third wall means in alignment with said grid.

3. In a serialograph, in combination, a pair of opposed elongated parallel end assemblies having inner faces directed toward each other and each of said inner faces being formed with a pair of elongated parallel grooves extending longitudinally of each assembly and separated by a rib; a bottom wall fixedly connected to and extending between said pair of end assemblies; a middle assembly located at an edge portion in one groove of each end assembly spaced from said bottom wall so that a cassette may be located on said bottom wall between the latter and said middle assembly and so that said middle assembly is shiftable to and from an operating position carried by said end assemblies; a top assembly located in the remaining grooves and separated by said ribs of said end assemblies from said middle assembly so that a cassette may be located on said middle assembly between said top and middle assemblies, said top assembly being removably connected to said end assemblies and said top assembly carrying a parallel grid through which a cassette on said middle assembly may be exposed, the material of said middle assembly permitting exposure of a cassette on said bottom wall through said top and middle assemblies; and shielded tray means located on said middle assembly between the latter and said top assembly for carrying a cassette between said middle and top assemblies while a cassette on said bottom wall is located beneath said shielded tray means, whereby after exposure of a cassette on said shielded tray means the latter may be shifted with the exposed cassette to enable the cassette on said bottom wall to be exposed.

4. In a serialograph, in combination, a pair of opposed elongated parallel end assemblies having inner faces directed toward each other and each of said inner faces being formed with a pair of elongated parallel grooves extending longitudinally of each assembly and separated by a rib; a bottom wall fixedly connected to and extending between said pair of end assemblies; a middle assembly located at an edge portion in one groove of each end assembly spaced from said bottom wall so that a cassette may be located on said bottom wall between the latter and said middle assembly and so that said middle assembly is shiftable to and from an operating position carried by said end assemblies; a top assembly located in the remaining grooves and separated by said ribs of said end assemblies from said middle assembly so that a cassette may be located on said middle assembly between said top and middle assemblies, said top assembly being removably connected to said end assemblies and said top assembly carrying a parallel grid through which a cassette on said middle assembly may be exposed, the material of said middle assembly permitting exposure of a cassette on said bottom wall through said top and middle assemblies; shielded tray means on said middle assembly between the latter and said top assembly for supporting a cassette between said middle and top assemblies during exposure of the latter cassette while preventing exposure of a cassette located beneath said shielded tray means between said bottom wall and middle assembly, whereby after exposure of the cassette on said tray means the latter together with the exposed cassette may be shifted to enable exposure of the cassette on said bottom wall to take place; and an extension carried by said end assemblies and extending beyond said top assembly while being located closely adjacent to the same, said extension being made of a shielding material through which an exposure cannot be made and said top assembly carrying also a shielding material next to said extension so that after a cassette is exposed it may be shifted to a position beneath the shielded portion of said top assembly and said extension.

5. In a serialograph, in combination, a pair of opposed elongated parallel end assemblies having inner faces directed toward each other and each of said inner faces being formed with a pair of elongated parallel grooves extending longitudinally of each assembly and separated by a rib; a bottom wall fixedly connected to and extending between said pair of end assemblies; a middle assembly located at an edge portion in one groove of each end assembly spaced from said bottom wall so that a cassette may be located on said bottom wall between the latter and said middle assembly and so that said middle assembly is shiftable to and from an operating position carried by said end assemblies; a top assembly located in the remaining grooves and separated by said ribs of said end assemblies from said middle assembly so that a cassette may be located on said middle assembly between said top and middle assemblies, said top assembly being removably connected to said end assemblies and said top assembly carrying a parallel grid through which a cassette on said middle assembly may be exposed, the material of said middle assembly permitting exposure of a cassette on said bottom wall through said top and middle assemblies; shielded tray means on said middle assembly between the latter and said top assembly for supporting a cassette between said middle and top assemblies during exposure of the latter cassette while preventing exposure of a cassette located beneath said shielded tray means between said bottom wall and middle assembly, whereby after exposure of the cassette on said tray means the latter together with the exposed cassette may be shifted to enable exposure of the cassette on said bottom wall to take place; and an extension carried by said end assemblies and extending beyond said top assembly while being located closely adjacent to the same, said extension being made of a shielding material through which an exposure cannot be made and said top assembly carrying also a shielding material next to said extension so that after a cassette is exposed it may be shifted to a position beneath the shielded portion of said top assembly and said extension, said extension extending beyond said middle assembly and said bottom wall, said middle assembly extending forwardly beyond said top assembly and said bottom wall extending forwardly beyond said middle assembly.

6. In a serialograph, in combination, a pair of opposed elongated parallel end assemblies having inner faces directed toward each other and each of said inner faces being formed with a pair of elongated parallel grooves extending longitudinally of each assembly and separated by a rib; a bottom wall fixedly connected to and extending between said pair of end assemblies; a middle assembly located at an edge portion in one groove of each end assembly spaced from said bottom wall so that a cassette may be located on said bottom wall between the latter and said middle assembly and so that said middle assembly is shiftable to and from an operating position carried by said end assemblies; a top assembly located in the remaining grooves and separated by said ribs of said end assemblies from said middle assembly so that a cassette may be located on said middle assembly between said top and middle assemblies, said top assembly being removably connected to said end assemblies and said top assembly carrying a parallel grid through which a cassette on said middle assembly may be exposed, the material of said middle assembly permitting exposure of a cassette on said bottom wall through said top and middle assemblies; shielded tray means on said middle assembly between the latter and said top assembly for supporting a cassette between said middle and top assemblies during exposure of the latter cassette while preventing exposure of a cassette located beneath said shielded tray means between said bottom wall and middle assembly, whereby after exposure of the cassette on said tray means the latter together with the exposed cassette may be shifted to enable exposure of the cassette on said bottom wall to take place; and roller means carried by one of said end assemblies at an outer face thereof opposed from said inner face so that the entire serialograph may be rested on said roller means to be transported from one location to another.

7. In a serialograph, in combination, a bottom wall; a pair of elongated parallel end assemblies fixed to said bottom wall; a top assembly removably carried by said end assemblies spaced from and substantially parallel to said bottom wall; a middle assembly also carried by said end assemblies, said middle assembly being located between, spaced from, and substantially parallel to said top assembly and said bottom wall, said top assembly having an elongated parallel grid extending substantially throughout the entire distance between said end assemblies and terminating short of the front and rear ends of said top assembly, said parallel grid having an area substantially equal to that of a cassette which also has a length substantially equal to the distance between said end assemblies, whereby a cassette located between said end assemblies will be guided thereby for movement between said middle and top assemblies or between said middle assembly and bottom wall, said top assembly carrying forwardly and rearwardly of said grid shielding portions so that exposures can be made only through said grid; and shielded tray means located on said middle assembly between the latter and said top assembly for supporting a cassette between said middle and top assemblies while shielding a cassette between said bottom wall and middle assembly so that both cassettes may be simultaneously positioned in alignment with said grid while said tray means and the cassette carried thereby may be shifted after exposure of the latter cassette to permit the cassette between said bottom wall and middle assembly to be exposed.

8. In a serialograph, in combination, a bottom wall; a pair of elongated parallel end assemblies fixed to said bottom wall; a top assembly removably carried by said end assemblies spaced from and substantially parallel to said bottom wall; a middle assembly also carried by said end assemblies, said middle assembly being located between, spaced from, and substantially parallel to said top assembly and said bottom wall, said top assembly having an elongated parallel grid extending substantially throughout the entire distance between said end assemblies and terminating short of the front and rear ends of said top assembly, said parallel grid having an area substantially equal to that of a cassette which also has a length substantially equal to the distance between said end assemblies, whereby a cassette located between said end assemblies will be guided thereby for movement between said middle and top assemblies or between said middle assembly and bottom wall, said top assembly carrying forwardly and rearwardly of said grid shielding portions so that exposures can be made only through said grid; shielded tray means located on said middle assembly between the latter and said top assembly for supporting a cassette between said middle and top assemblies while shielding a cassette between said bottom wall and middle assembly from exposure during exposure of the cassette carried by said tray means, whereby after the latter cassette is exposed it may be shifted together with said tray means to permit exposure of the cassette between said bottom wall and middle assembly; and a shielded extension removably connected to said end assemblies and extending rearwardly therefrom while being located closely adjacent to said top assembly so that an exposed cassette on said middle assembly can be moved beneath a shielded portion of said top assembly and said extension while projecting beyond said middle assembly.

9. In a serialograph, in combination, a bottom wall; a pair of elongated parallel end assemblies fixed to said bottom wall; a top assembly removably carried by said end assemblies spaced from and substantially parallel to said bottom wall; a middle assembly also carried by said end assemblies, said middle assembly being located between, spaced from, and substantially parallel to said top assembly and said bottom wall, said top assembly having an elongated parallel grid extending substantially throughout the entire distance between said end assemblies and terminating short of the front and rear ends of said top assembly, said parallel grid having an area substantially equal to that of a cassette which also has a length substantially equal to the distance between said end assemblies, whereby a cassette located between said end assemblies will be guided thereby for movement between said middle and top assemblies or between said middle assembly and bottom wall, said top assembly carrying forwardly and rearwardly of said grid shielding portions so that exposures can be made only through said grid; shielded tray means located on said middle assembly between the latter and said top assembly for supporting a cassette between said middle and top assemblies while shielding a cassette between said bottom wall and middle assembly from exposure during exposure of the cassette carried by said tray means, whereby after the latter cassette is exposed it may be shifted together with said tray means to permit exposure of the cassette between said bottom wall and middle assembly; and a shielded extension removably connected to said end assemblies and extending rearwardly of said top assembly while being located closely adjacent to said top assembly so that an exposed cassette on said middle assembly can be moved beneath a shielded portion of said top assembly and said extension while projecting beyond said middle assembly, said middle assembly having a front end extending forwardly beyond said top assembly and said bottom wall having a front end extending forwardly beyond said middle assembly; and a pallette for moving cassettes in the spaces between said bottom wall and middle assembly and middle assembly and top assembly, said pallette having indicating portions indicating the position in which said pallette should be placed with respect to said front edges of said middle assembly and bottom wall in order to properly locate a cassette in alignment with the grid of said top assembly.

10. In a serialograph, in combination, a bottom wall; a pair of elongated parallel end assemblies fixed to said bottom wall; a top assembly removably carried by said end assemblies spaced from and substantially parallel to said bottom wall; a middle assembly also carried by said end assemblies, said middle assembly being located between, spaced from, and substantially parallel to said top assembly and said bottom wall, said top assembly having an elongated parallel grid extending substantially throughout the entire distance between said end assemblies and terminating short of the front and rear ends of said top assembly, said parallel grid having an area substantially equal to that of a cassette which also has a length substantially equal to the distance between said end assemblies, whereby a cassette located between said end assemblies will be guided thereby for movement between said middle and top assemblies or between said middle assembly and bottom wall, said top assembly carrying forwardly and rearwardly of said grid shielding portions so that exposures can be made only through said grid; shielded tray means located on said middle assembly between the latter and said top assembly for supporting a cassette between said middle and top assemblies while shielding a cassette between said bottom wall and middle assembly from exposure during exposure of the cassette carried by said tray means, whereby after the latter cassette is exposed it may be shifted together with said tray means to permit exposure of the cassette between said bottom wall and middle assembly; a shielded extension removably connected to said end assemblies and extending rearwardly therefrom while being located closely adjacent to said top assembly so that an exposed cassette on said middle assembly can be moved beneath a shielded portion of said top assembly and said extension while projecting beyond said middle assembly; and a pair of extensions integral with said end assemblies, respectively, and carrying said shielded extension.

References Cited by the Examiner
UNITED STATES PATENTS

| | | | |
|---|---|---|---|
| 1,977,770 | 10/34 | Lee | 250—66 |
| 2,004,232 | 6/35 | Weed | 250—66 |
| 2,107,825 | 2/38 | Humphreys | 250—66 |
| 2,617,944 | 11/52 | Sanchez-Perez | 250—66 |
| 2,680,199 | 6/54 | Abel | 250—58 |
| 2,795,702 | 6/57 | Morris | 250—66 |
| 2,832,893 | 4/58 | Camardella | 250—66 |

FOREIGN PATENTS 430,838    6/26    Germany.

RALPH G. NILSON, *Primary Examiner.*